US006712192B1

(12) United States Patent
Hester et al.

(10) Patent No.: US 6,712,192 B1
(45) Date of Patent: Mar. 30, 2004

(54) STAIRCASE GUIDE FOR A STAIRLIFT

(75) Inventors: Martinus J. Hester, Heerhugowaard (NL); Dennis Vroegindeweij, Hoofddorp (NL)

(73) Assignee: Freelift B.V., Heerhugowaard (NL)

( * ) Notice: Subject to any disclaimer, the term of this patent is extended or adjusted under 35 U.S.C. 154(b) by 75 days.

(21) Appl. No.: 10/129,071

(22) PCT Filed: Nov. 3, 2000

(86) PCT No.: PCT/NL00/00802

§ 371 (c)(1),
(2), (4) Date: Sep. 5, 2002

(87) PCT Pub. No.: WO01/32543

PCT Pub. Date: May 10, 2001

(51) Int. Cl.[7] .................... B65G 15/00
(52) U.S. Cl. .................... 198/321; 187/201; 187/270
(58) Field of Search .................... 198/321; 104/128; 187/201, 270; 414/921

(56) References Cited

U.S. PATENT DOCUMENTS

| | | | | |
|---|---|---|---|---|
| 2,824,623 A | * 2/1958 | Nord et al. | 187/201 |
| 3,313,376 A | * 4/1967 | Holland, Sr. | 187/241 |
| 4,627,517 A | * 12/1986 | Bor | 187/201 |
| 5,230,405 A | * 7/1993 | Bartelt | 187/201 |
| 5,533,594 A | * 7/1996 | Tremblay et al. | 187/201 |
| 5,641,040 A | * 6/1997 | Grass | 187/201 |
| 5,964,159 A | * 10/1999 | Hein | 104/128 |
| 6,082,496 A | * 7/2000 | Bovis et al. | 187/201 |
| 6,332,512 B1 | * 12/2001 | Muranaka | 187/201 |
| 6,435,308 B2 | * 8/2002 | Grass | 187/201 |

FOREIGN PATENT DOCUMENTS

| | | | |
|---|---|---|---|
| DE | WO 94/22757 | * 2/1994 | |
| DE | 43 10 806 A | * 10/1994 | B66B/9/08 |
| EP | 0 033 294 | 8/1981 | |
| WO | WO 95/15909 | 6/1995 | |

* cited by examiner

*Primary Examiner*—Richard Ridley
(74) *Attorney, Agent, or Firm*—Webb Ziesenheim Logsdon Orkin & Hanson, P.C.

(57) ABSTRACT

A staircase guide for a device for ascending a staircase, the device has a frame with a carrying element for people or goods and a drive connected to the frame. The guide has a cylindrical tube to be adapted to a staircase with at least one protrusion which extends in longitudinal direction of the tube. The tube has an engaging surface for co-action with a drive element of the drive for the purpose of displacing the stairlift and a support surface for support of the drive by a support member in order to hold at least the carrying element upright.

9 Claims, 2 Drawing Sheets

STAIRCASE GUIDE FOR A STAIRLIFT

BACKGROUND OF THE INVENTION

1. Field of the Invention

The present invention relates to a staircase guide for a device for ascending a staircase, for instance a chair lift and so on, in addition to the device and also an assembly of staircase guide and device.

2. Description of the Related Art

Such staircase guides are generally known, wherein the staircase guide and the device co-act. The device comprises for instance a frame with a carrying element for people or goods and a drive connected to the frame. The staircase guide comprises a cylindrical tube to be adapted to a staircase shape.

The known staircase guides usually comprise two tubes which are both engaged by the drive or by the frame of the device in order to hold the carrying element, such as a chair, upright. Used as alternative in known staircase guides are guides of rectangular cross-section, one of which is then needed to hold the frame with the carrying element upright.

Known staircase guides with two cylindrical tubes have the drawback that the tubes must be situated at a constant distance relative to one another everywhere along the staircase. Much mounting material is furthermore required to arrange two cylindrical tubes. This is also the case for the material for the guides themselves. In addition, mounting of the circular tubes at mutually equal distances is difficult and time-consuming, wherein the correct alignment for both tubes must be found. Users moreover do not find the hereby created appearance very attractive.

Known staircase guides with a single staircase guide of substantially rectangular cross-section provide support possibilities on the frame of the device, so that the carrying element can be held upright, but are much more difficult to adapt to the course or an existing staircase. In the manufacture of such a guide of rectangular cross-section, bends arranged therein can form a considerable weakening when the great forces required are disadvantageously exerted for this purpose. Conversely, this tube better satisfies the aesthetic requirements of users.

SUMMARY OF THE INVENTION

The invention has for its object to obviate or at least reduce the drawbacks of the known art, for which purpose a staircase guide is provided which is distinguished in that one cylindrical tube is applied with at least one protrusion extending in longitudinal direction of the tube. The protrusion comprises an engaging surface for co-action with a drive element of the drive for the purpose of displacing the stairlift and a support surface for support of the drive by a support member in order to hold at least the carrying element upright. Elimination of the rotation degree of freedom thus results with a construction which can be realized in relatively simple manner.

In a staircase guide according to the present invention a single cylindrical guide is applied which is much easier to bend relative to a guide of rectangular cross-section.

With bending of the cylindrical guide the staircase guide is adapted to the shape or the progression of the existing staircase where the assembly of for instance stairlift as device and guide must be arranged. It is moreover possible to suffice with a single staircase guide where in the past two cylindrical guides were required in the known assemblies to hold for instance a carrying element of the device upright. Production and mounting are therefore both considerably simplified. The production costs are also reduced. Aesthetic aspects are hereby also improved. Teeth of a gear rack are thus not visible, and there is no danger of grease getting onto the clothing of people walking along the staircase guide.

It is noted that different protrusions can be provided, each fulfilling a function. A first protrusion can thus comprise the drive surface, while another protrusion forms the support surface. Although this entails a higher material consumption, such a configuration can be advantageously applied in respect of the distribution of forces round the cylindrical tube.

BRIEF DESCRIPTION OF THE DRAWINGS

In a favourable embodiment the protrusion comprises a gear rack arranged on the tube. In this embodiment a toothed surface of the gear rack can form the engaging surface. A gear rack is per se a very favourable and simple embodiment for realizing the engaging surface. The toothed surface is herein preferably directed away from the tube in radial direction and the support surface comprises a side of the gear rack. Such an embodiment has the distinct advantage that the forces exerted by the drive on the toothed surface of the gear rack are directed through the central axis of the cylindrical tube. This produces a very favourable action of forces without the danger for instance of the drive losing grip on the gear rack or running off it in bends of the staircase guide. The drive is further relieved of load compared to an embodiment of the present invention wherein the toothed surface simultaneously forms the support surface and the engaging surface, since in such an embodiment the forces to prevent rotation of the frame on the cylindrical tube are exerted on the toothed surface by the drive, whereby the drive undergoes a higher load than only that necessary to cause movement of the stairlift. In such an embodiment a lighter motor can thus be applied and the gear rack and the other components of the drive can be adjusted hereto, which produces an overall lighter construction. This results in alleviation of the work of mounting and assembling personnel, which is favourable in the context of legislation relating to working conditions.

The present invention will be further described below with reference to an embodiment which is shown in FIG.1 shows a perspective view of a stairlift on part of a staircase guide.

DETAILED DESCRIPTION OF THE INVENTION

Figure 1:
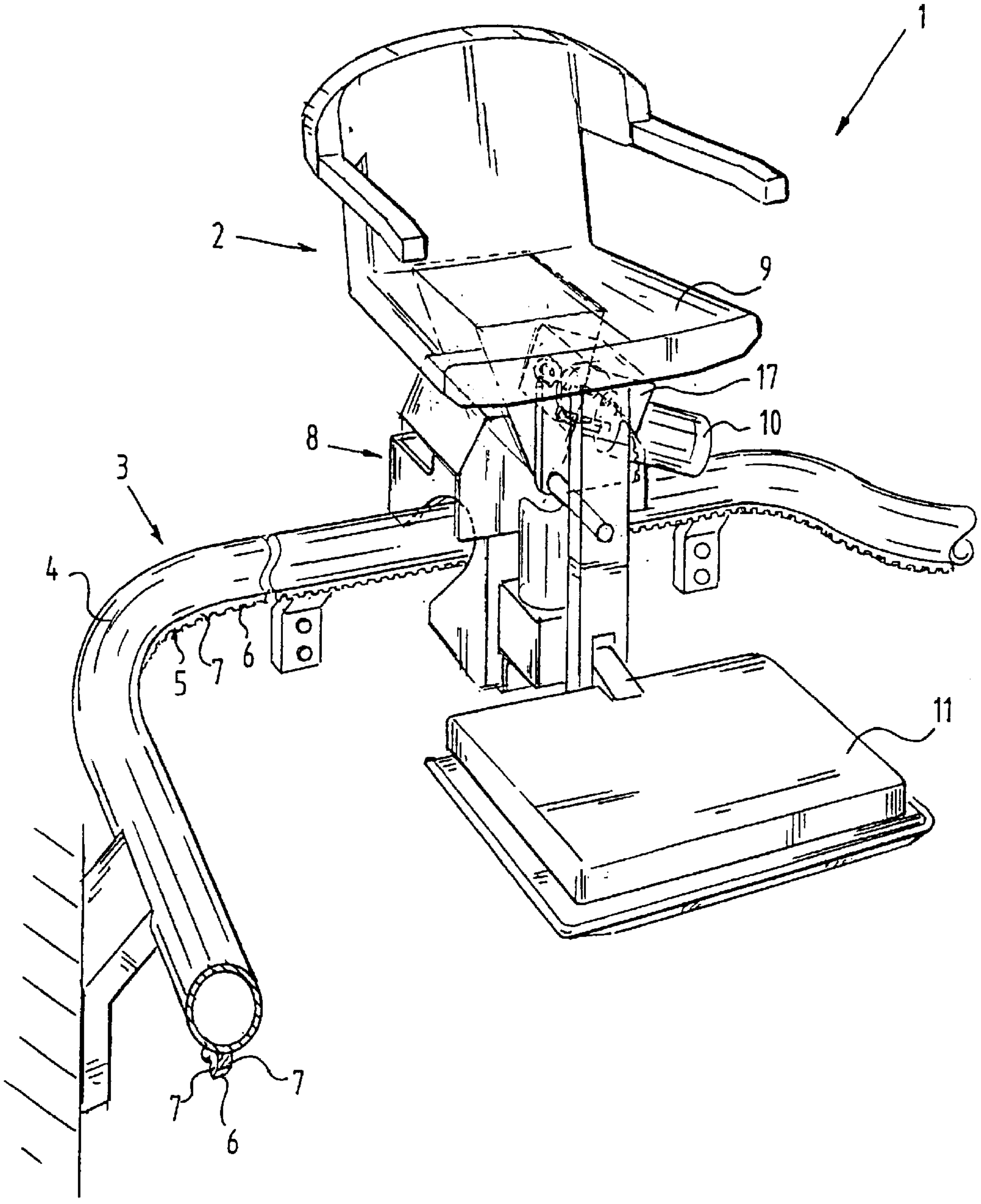

Identical or similar components or parts are designated in the different figures with the same reference numerals.

FIG. 1 shows an assembly 1 according to the present invention. This assembly comprises a stairlift 2 and a guide 3. Guide 3 comprises a cylindrical tube 4. Arranged on the underside of tube 4 is a gear rack 5, the toothed surface of which is directed downward. Gear rack 5 thus extends in radial direction, wherein toothed surface 6 forms an engaging surface for engagement by the drive of stairlift 2. Because the toothed surface is directed away from tube 4 in radial direction, a very favourable action of forces of the drive, to be further described hereinbelow, of stairlift 2 is obtained.

Downward extending side surfaces 7 are situated on either side of the toothed surface of gear rack 5. These side surfaces 7 function as support surfaces in a manner to be further described hereinbelow.

Stairlift 2 comprises a frame 8 on which is arranged a carrying element designed as a chair 9.

The frame comprises a device which determines the position of chair 9 and step-on platform 11 and which is driven by a motor 10. This ensures that during displacement along the tube 4, wherein this latter runs obliquely up or downward, the chair 9 and step-on platform 11 remain upright. The progression of the tube is for instance stored in a memory (not shown), wherein motor 10 is driven in order to hold chair 9 and the step-on platform upright along the length of tube 4.

Motor 10 is arranged between frame 8 and chair 9 via a transmission comprising a gearbox 17. Frame 8 comprises a superstructure 18 having thereon the chair 9 and a base part 19 containing the moving parts for stairlift 2. Base part 19 and superstructure 18 are tiltable relative to each other under the influence of motor 10 together with gearbox 17, wherein superstructure 18 and base part 19 are mutually connected for tilting on a shaft 20. Gearbox 17 is arranged at a distance from shaft 20 between base part 19 and the superstructure and pushes or pulls superstructure 18 into a desired tilt position relative to base part 19 using a worm wheel rod 21 driven by motor 10.

In base part 19 are arranged freely rotatable running wheels 13 which engage on the outer surface of tube 4. The weight of the stairlift optionally having a person or goods thereon acts for the most part on the upper of the running wheels 13, while the sideward orientated running wheel 13 serves substantially for reliable guiding.

The toothed surface 6 of gear rack 5 is engaged by a toothed wheel 14, which is connected to a motor 16 via a shaft 15. Motor 16 forms the drive, while toothed wheel 14 forms the drive element. Toothed wheel 14 extends between two slide blocks 12, which are also situated on either side of gear rack 5, i.e. at a short distance from or in contact with the side surfaces 7 of gear rack 5. Side surfaces 7 of gear rack 5 thus form support surfaces for slide blocks 12, which thus serve as support member for stairlift 2.

A strip 22 is otherwise arrange- on at least one support surface 7. This strip preferably has a low sliding resistance when slide blocks 12 support thereon. Strip 22 is then less essential when use is made of running wheels instead of slide blocks 12.

Figure 2:
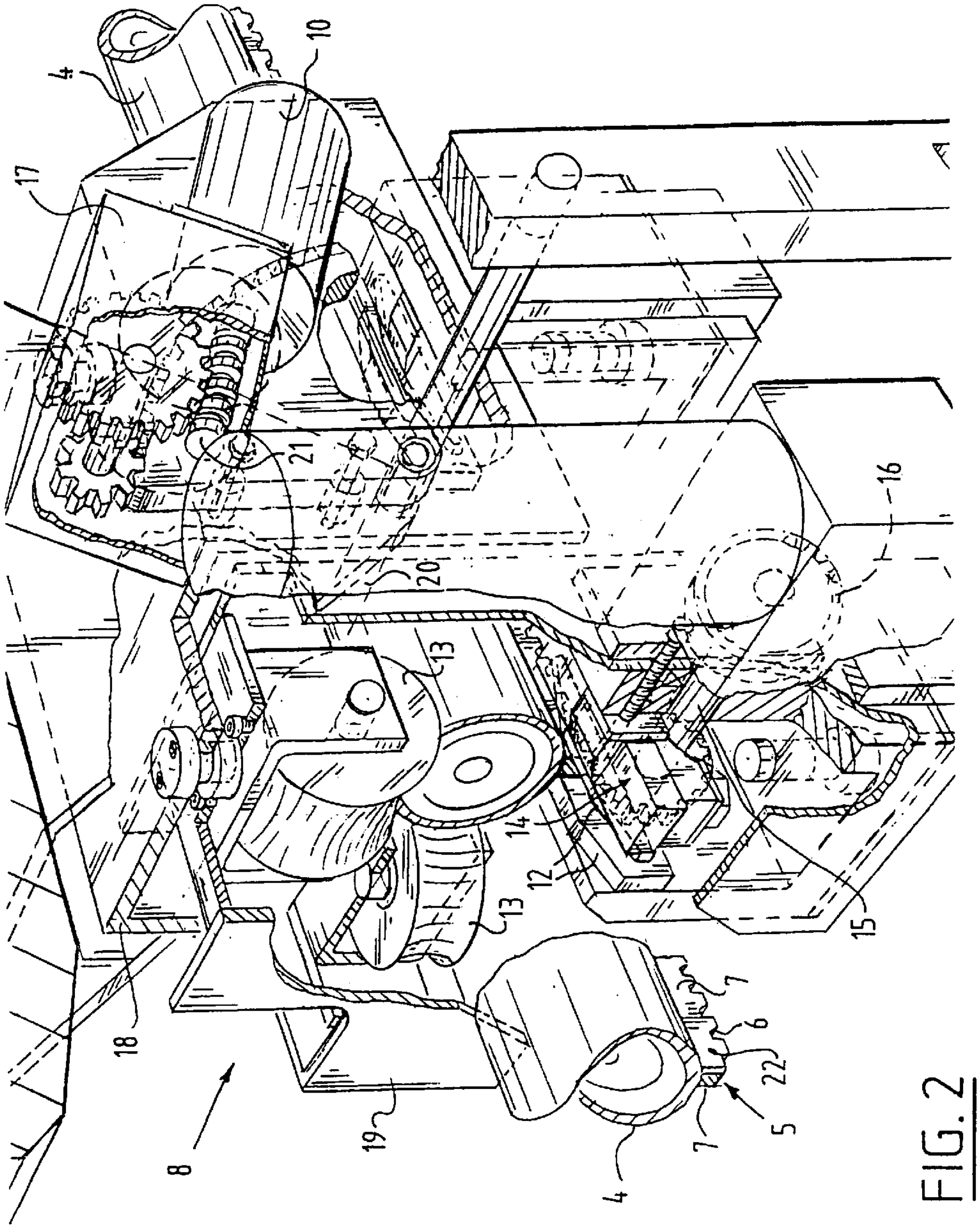
FIG. 2 shows in partly cut away perspective view a detail of the stairlift and guide shown in FIG. 1.

In the embodiment with slide blocks 12 shown in FIG. 2, the stairlift is particularly suitable for a guide with few bends, since slide blocks 12 have a limited capacity to follow a bend.

In an embodiment (not shown) use can be made, instead of slide blocks 12, of one or more than one running wheel which supports against the side surface 7 of gear rack 5 forming a support surface. Such an embodiment of the invention is better able to negotiate bends in tube 4 as a result of the limited contact surface between side surfaces 7 of gear rack 5 and the running wheels (not shown) which support thereon.

Because toothed wheel 14 engages the toothed surface 6 of gear rack 5 in a direction in the line of which the central axis of tube 4 is situated, a very favourable distribution of forces is obtained. The only load on motor 16 is that required to move stairlift 2 along the guide. If toothed surface 6 of gear rack 5 were to be situated laterally, i.e. at the position where in FIGS. 1 and 2 one of the side surfaces 7 of gear rack 5 is now situated, toothed wheel 14 would also be loaded with support forces, for which purpose a heavier motor would be required.

With the alignment of toothed surface 6 of gear rack 5 shown in FIG. 1 and in FIG. 2 and the corresponding positioning of toothed wheel 14, a very favourable orientation of both components relative to each other is moreover obtained, particularly in bends, and, even if tube 4 or any other component were to display some play, the danger of toothed wheel 14 of toothed surface 6 running off the gear rack or losing grip is minimized.

The present invention is described in the foregoing with reference to a single embodiment thereof. The invention is however not limited hereto, but is defined as the combination of measures of the main claim. The dependent claims relate to preferred embodiments. A number of protrusions, also embodied or designed otherwise than as gear rack, can thus also be arranged on the tube, wherein each of the protrusions fulfils a separate function, i.e. supporting or driving. A solution other than gearbox 17 with motor 10 can be chosen, also within the scope of the present invention, for holding upright the chair and the associated components, such as the step-on platform. Tube 4 can be solid or hollow, although a hollow tube 4 is of course the easier to bend without unacceptable losses of strength etc. When use is made of a toothed wheel 14 for the driving, the toothed surface of the gear rack can be replaced with an array of successive notches in tube 4, in which notches engage the teeth of toothed wheel 14. In such an embodiment a different protrusion must be provided to support stairlift 2. There are thus many other variants and alternative embodiments within the scope of the present invention which will occur to the skilled person after perusal of the foregoing.

What is claimed is:

1. An installation for ascending/descending a staircase, comprising:

a device, including a frame with a carrying element for people or goods and a drive connected to the frame; and a staircase guide including a single cylindrical tube configured to the staircase and having a protrusion extending in a longitudinal direction of the tube, wherein the protrusion includes:

(i) an engaging surface for co-action with a drive element of the drive for the purposes of displacing the device; and (ii) a support surface for support of the drive by a support member in order to hold at least the carrying element upright against rotation of the device around the single cylindrical tube.

2. The installation as claimed in claim 1, wherein the engaging surface and the support surface form separate surfaces of the protrusion.

3. The installation as claimed in claim 1, wherein the protrusion comprises a gear rack arranged on the tube.

4. The installation as claimed in claim 3, wherein a toothed surface of the gear rack forms the engaging surface.

5. The installation as claimed in claim 4, wherein the toothed surface is directed away from the tube in a radial direction and the support surface comprises a side of the gear rack.

6. The installation as claimed in claim 1, wherein the support member comprises a running wheel or a slide block.

7. The installation as claimed in claim 1, wherein the drive element comprises a toothed wheel.

8. The installation as claimed in claim 1, wherein the carrying element comprises a chair.

9. A staircase guide for use with an installation for ascending/descending a staircase, the guide comprising:

a single cylindrical tube adapted configured to the staircase and having a protrusion extending in a longitudinal direction of the tube, wherein the protrusion includes:

(i) an engaging surface for co-action with a drive element of a drive for the purpose of displacing a stairlift; and (ii) a support surface for support of the drive by a support member in order to hold at least the carrying element of the stairlift upright, against rotation around the cylindrical tube.

* * * * *

UNITED STATES PATENT AND TRADEMARK OFFICE

CERTIFICATE OF CORRECTION

PATENT NO. : 6,712,192 B1
DATED : March 30, 2004
INVENTOR(S) : Hester et al.

It is certified that error appears in the above-identified patent and that said Letters Patent is hereby corrected as shown below:

<u>Column 4,</u>
Line 55, "tube adapted configured" should read -- tube configured --.

Signed and Sealed this

Seventh Day of September, 2004

JON W. DUDAS
*Director of the United States Patent and Trademark Office*